(12) United States Patent
Kim

(10) Patent No.: US 10,446,172 B2
(45) Date of Patent: Oct. 15, 2019

(54) NOISE SOURCE VISUALIZATION DATA ACCUMULATION AND DISPLAY DEVICE, METHOD, AND ACOUSTIC CAMERA SYSTEM

(71) Applicant: SM INSTRUMENT CO., LTD., Daejeon (KR)

(72) Inventor: Young Ki Kim, Daejeon (KR)

(73) Assignee: SM INSTRUMENT CO., LTD., Daejeon (KR)

( * ) Notice: Subject to any disclaimer, the term of this patent is extended or adjusted under 35 U.S.C. 154(b) by 316 days.

(21) Appl. No.: 15/340,147

(22) Filed: Nov. 1, 2016

(65) Prior Publication Data

US 2017/0337938 A1    Nov. 23, 2017

(30) Foreign Application Priority Data

May 18, 2016    (KR) .......................... 10-2016-0060542

(51) Int. Cl.
| | |
|---|---|
| *G01L 21/10* | (2006.01) |
| *G01S 7/52* | (2006.01) |
| *H04R 1/40* | (2006.01) |
| *G10L 21/10* | (2013.01) |

(52) U.S. Cl.
CPC .......... *G10L 21/10* (2013.01); *G01S 7/52044* (2013.01); *H04R 1/406* (2013.01)

(58) Field of Classification Search
CPC ...... G10L 21/10; H04R 1/406; G01S 7/52044
USPC .......................................................... 348/163
See application file for complete search history.

(56) References Cited

U.S. PATENT DOCUMENTS

2016/0277863 A1*    9/2016   Cahill .................... H04R 3/005

FOREIGN PATENT DOCUMENTS

| KR | 1019980038017 | 8/1998 |
|---|---|---|
| KR | 1008382390000 | 6/2008 |
| KR | 1020100128855 | 12/2010 |

\* cited by examiner

*Primary Examiner* — Jeffery A Williams
(74) *Attorney, Agent, or Firm* — IPLA P.A.; James E. Bame

(57) ABSTRACT

A noise source visualization data accumulation and display device is provided where at two or more acoustic data are generated by beamforming acoustic signals acquired at different moments by using a plurality of microphone arrays and thereafter, one selected among two or more acoustic data or acoustic data processed therefrom is mapped to one optical image to be displayed.

6 Claims, 13 Drawing Sheets

FIG. 1D

Definition Beam-Power Level

- Sound Pressure Level(SPL, $L_p$)

$$SPL(L_p) = 10\log_{10}\left(\frac{p_{rms}}{p_{ref}}\right)^2$$

$p_{ref}$ : 20μPa(20 × 10$^{-6}$ N/m²)

- Beam-Power Level(BPL)

$$BPL = 10\log_{10}\left(\frac{z_{rms}}{p_{ref}}\right)^2$$

Expressible by a source prediction level according to weight function (considering distance)

Max. 45.1 dB

Max. 57.7 dB

Max-mean. 10 dB

Max-mean. 6.2 dB

FIG. 7

$$\left\{ \begin{array}{l} M(i,j) = \dfrac{\{P(i,j) - Avg\,\underset{T1}{\Downarrow}\} + \{P(i,j) - Avg\,\underset{T2}{\Downarrow}\} + \underset{T3}{\Downarrow}}{N} \\[2em] M(i,j) = \dfrac{\dfrac{P(i,j)}{OA1}\underset{T1}{\Downarrow} + \dfrac{P(i,j)}{OA2}\underset{T2}{\Downarrow}}{2} \quad (OA : \text{Over All Level}) \\[2em] M(i,j) = \dfrac{P(i,j) - Min}{Max - Min}\underset{T1}{\Downarrow} + \dfrac{P(i,j) - Min}{Max - Min}\underset{T2}{\Downarrow} + \underset{T3}{\Downarrow}\bigcirc \end{array} \right\}$$

NOISE SOURCE VISUALIZATION DATA ACCUMULATION AND DISPLAY DEVICE, METHOD, AND ACOUSTIC CAMERA SYSTEM

BACKGROUND

The present invention relates to a noise source visualization data accumulation and display method and an acoustic camera system.

An acoustic camera as high tech measurement equipment visualizing sound is new technology equipment required in various fields, such as a multimedia information communication apparatus, a home appliance, an automobile, a construction, and the like. Registration Patent No. 10-1213539 (SM Instruments) possessed by an applicant of the present invention, which is the related art is configured by mounting a plurality of MEMS microphones on a printed circuit board and discloses an acoustic sensing device using a MEMS microphone array, which is characterized in that the MEMS microphone has 2 to 10 wing parts which extend in a radial direction.

Registration Patent No. 10-1471299 (SM Instruments) possessed by an applicant of the present invention, which is the related art discloses a mobile acoustic camera which is configured to include a front body in which acoustic sensing units of MEMS microphones are disposed toward the front side; the MEMS microphones in which the acoustic sensing units are exposed to the front body while being fixed to a substrate; the substrate on which the MEMS microphones are mounted; an image pick-up unit in which a pick-up lens is exposed through a lens hole of the front body; and a rear body covering a rear side of the substrate and the rear side of the image pick-up unit while the substrate is positioned on a rear surface of the front body and further include a handle unit in which the MEMS microphones have 2 to 30 wing parts which extend in a straight-line, curve, or spiral shape in a radial direction and 2 to 50 MEMS microphones are arranged in one wing part W to be spaced apart, and which protrudes rearward while being fixed to a periphery of the front body or the rear body.

As described above, a microphone array beamformer as one of methods for investigating a position of a noise source is a method that measures sound waves generated from the noise source by using multiple microphone sensors and visualizes a distribution of the noise source like a photograph through signal processing of the measured sound waves. Used is a method that reconfigures the sound waves as a signal generated at a specific transmitting position according to a characteristic of a signal received by each microphone to measure a sound pressure size of the signal and displays a measured sound pressure level in a spatial distribution to estimate the position of the noise source. A measurement technique of the acoustic camera has been developed for a research purpose of a special field, but is extensively applied as utilization in a research/development step of each industrial field due to an advantage of intuitively verifying the distribution of the noise source.

SUMMARY OF THE INVENTION

The present invention has been made in an effort to provide an acoustic camera system that effectively discovers noise and allophone generated at different points at different moments to display the discovered noise and allophone so that a user easily recognize the discovered noise and allophone.

When a triggering technique using the size of simple sound pressure is used, a problem occurs, in which a noise source which becomes a measurement analysis target is triggered when background noise by peripheral noise is turned on at the moment when noise is not generated, and as a result, a characteristic of noise to be analyzed is buried and not displayed by undesired noise (background noise) and the present invention has been made in an effort to provide a noise source visualization data accumulation display method and an acoustic camera system which solve the problem.

The present invention has been made in an effort to provide a noise source visualization data accumulation display method and an acoustic camera system which can clearly determine positions of a plurality of noise sources by accumulatively displaying noise generated at different points at different moments in machinery, electronic devices, vehicles, and the like on one screen and display noise levels of noise sources in order, and exclude an influence of not a noise source region but external noise from a sound visualization screen by unique triggering or an effective data sorting method.

An exemplary embodiment of the present invention provides a noise source visualization data accumulation display data processing device in which at two or more acoustic data D1 and D2 are generated by beamforming acoustic signals acquired at different moments by using a plurality of microphone arrays and thereafter, one selected among two or more acoustic data or acoustic data M3 processed therefrom is mapped to one optical image to be displayed.

Another exemplary embodiment of the present invention provides a noise source visualization data accumulation display data processing method including: a step of providing an acoustic and image signal acquiring means configured to include MEMS acoustic sensors disposed to be spaced apart on a curve or a plane at a regular interval to sense an acoustic signal of a noise source, an acoustic signal acquiring unit converting the acoustic signal received from the MEMS acoustic sensors into a digital signal and transmitting the digital signal to a central processing unit, and a pick-up lens picking up an optical image of the noise source; an initial signal acquiring step in which the acoustic and image signal acquiring means acquires the acoustic signal and the acoustic image of the noise source during a first time frame; an initial analysis step in which the central processing unit calculates beam power of each point based on the acoustic signal acquired during the first time frame to generate first acoustic data and generate image data based on a signal of the pick-up lens; an initial expression step in which a display unit coordinates the first acoustic data and image data calculated by the central processing unit and overlays the first acoustic data and image data to visually express the first acoustic data and image data; an accumulation signal acquiring step in which the acoustic signal acquiring unit acquires the acoustic signal of the noise source during a second time frame which is temporally later than the first time frame; an accumulation signal analyzing step in which the central processing unit calculates the beam power of each point based on the acoustic signal acquired during the second time frame to generate accumulated acoustic data; and an accumulation expression step in which the display unit overlays and maps an acoustic matrix calculated by using the second acoustic data and the initial acoustic data or the second acoustic data and the initial acoustic data to image data to visually express the acoustic matrix mapped to the image data.

In the initial analysis step or the accumulation signal analyzing step, when a value calculated by using a difference value of at least two beam power values selected among beam power values of each point calculated based on the acoustic signal during one time frame is larger than a predetermined value, the central processing unit may treat the value as the effective acoustic data to map the value to the image data and overlay and display the value mapped to the image data or make the value as a triggering signal of data storing.

In the initial analysis step or the accumulation signal analyzing step, when a difference of a maximum value $P_{max}$ and a minimum value $P_{min}$ among the beam power $(P_{ij})$ values is larger than a predetermined reference value $\Delta P1$ or a difference of the maximum value $P_{max}$ and an average value $P_{mean}$ is larger than a predetermined reference value $\Delta P2$, the central processing unit may treat the value as the effective acoustic data to map and overlay and display the value to the image data or make the value as the triggering signal of the data storing.

When a standard deviation value of the beam power $(P_{ij})$ values of each point calculated based on the acoustic signal acquired during one time frame is larger than a predetermined reference, the central processing unit may determine that effective noise is generated and treats the effective noise as the effective acoustic data to map the value as the effective acoustic data to map the value to the image data and overlap and display the value mapped to the image data or make the value as the triggering signal of the data storing.

According to the present invention, provided is an acoustic camera system that effectively discovers noise and allophone generated at different points at different moments to display the discovered noise and allophone so that a user easily recognize the discovered noise and allophone.

In a noise source visualization data accumulation display method and an acoustic camera system of the present invention, triggering is performed by considering whether effective noise is generated from a target noise source due to a difference value among components of an acoustic data matrix of one frame, which is measured in one time zone or only in this case, the noise is handled as effective data, and as a result, a problem is solved, in which a noise source which becomes a measurement analysis target is triggered when background noise by peripheral noise is turned on at the moment when noise is not generated, and as a result, a characteristic of noise to be analyzed is buried and not displayed by undesired noise (background noise).

A noise source visualization data accumulation display method and an acoustic camera system of the present invention of the present invention can clearly determine positions of a plurality of noise sources by accumulatively displaying noise generated at different points at different moments in machinery, electronic devices, vehicles, and the like on one screen and display noise levels of noise sources in order, and exclude an influence of not a noise source region but external noise from a sound visualization screen by unique triggering or an effective data sorting method.

BRIEF DESCRIPTION OF THE DRAWINGS

FIGS. 1A to 1D are explanatory diagrams of a beamforming concept.

FIG. 7 illustrates a diagram showing values of each time frame according to the present invention.

DETAILED DESCRIPTION OF THE INVENTION

Figure 1A:
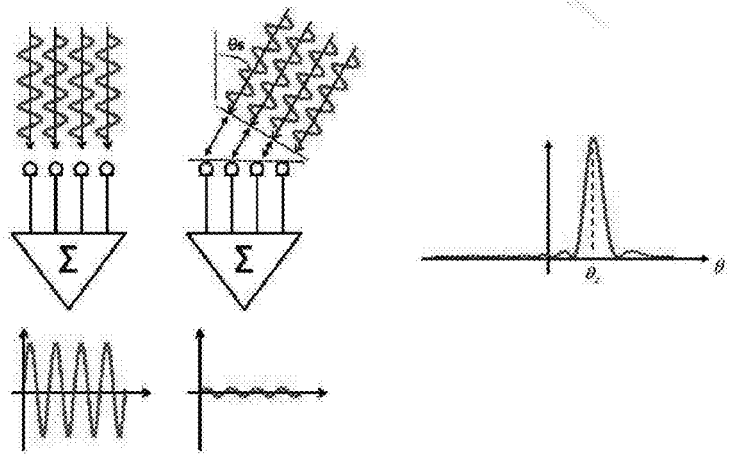
Figure 1B:
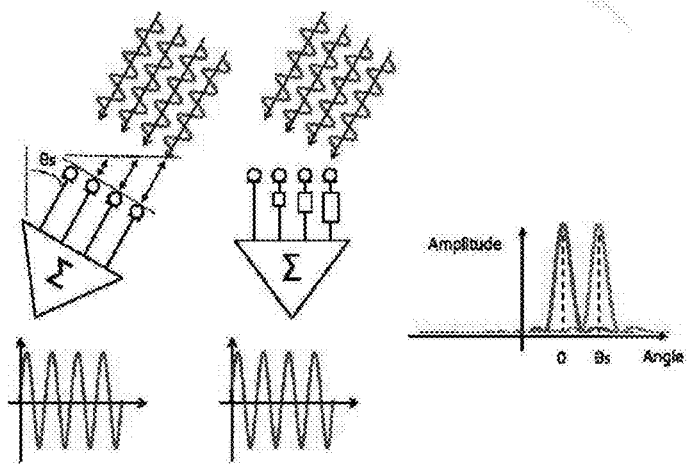
Figure 1C:
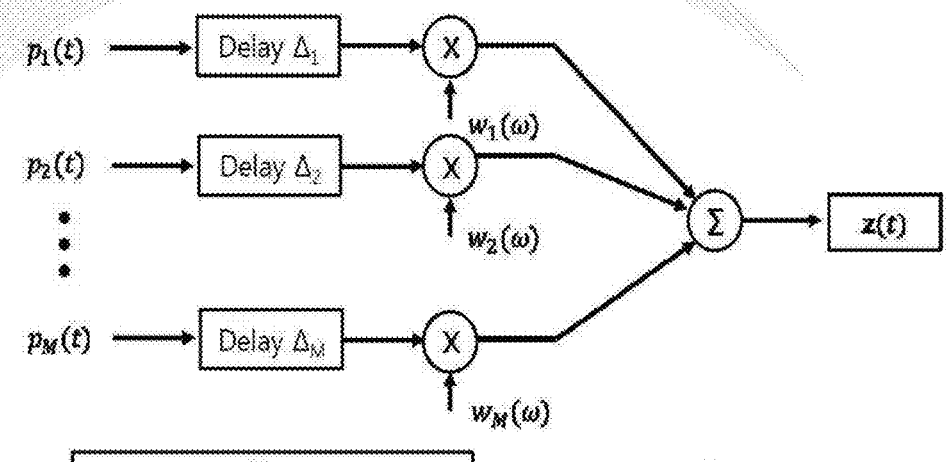

FIGS. 1A and 1B are explanatory diagrams of a beamforming concept. A beamforming technique may be described through an equation given below. yi(t) represents a signal measured in an i-th microphone and z(t) represents a beam output. When respective signals measured by M microphone are multiplied by a weight according to a sensor by giving a time delay in a virtual sound source direction and thereafter, the signals are added, beam power may be acquired. When directions of an actual sound source and a virtual sound source coincide with each other, the signals are amplified. By such a method, a position of a noise source may be estimated. The beam power may be expressed by the equation given below.

$$b(t) = \sum_{j} p_{m(t-\Delta t_j)}$$

When a virtual noise source is present at a predetermined position, the size of the noise source may be expressed by the equation given below.

$$s(t) = \sum_{j} \frac{1}{r_j} ei[kr_j - \omega(t + \Delta t_j)]$$

Figure 2A:
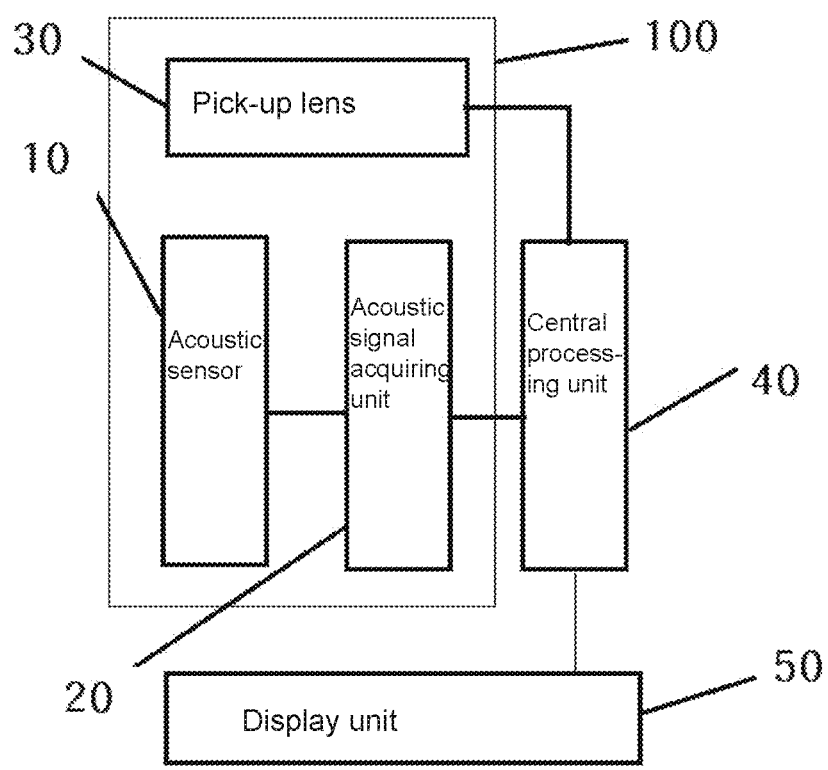
FIGS. 2A and 2B are configuration diagrams of a source noise visualization data accumulation display acoustic camera system.
Figure 2B:
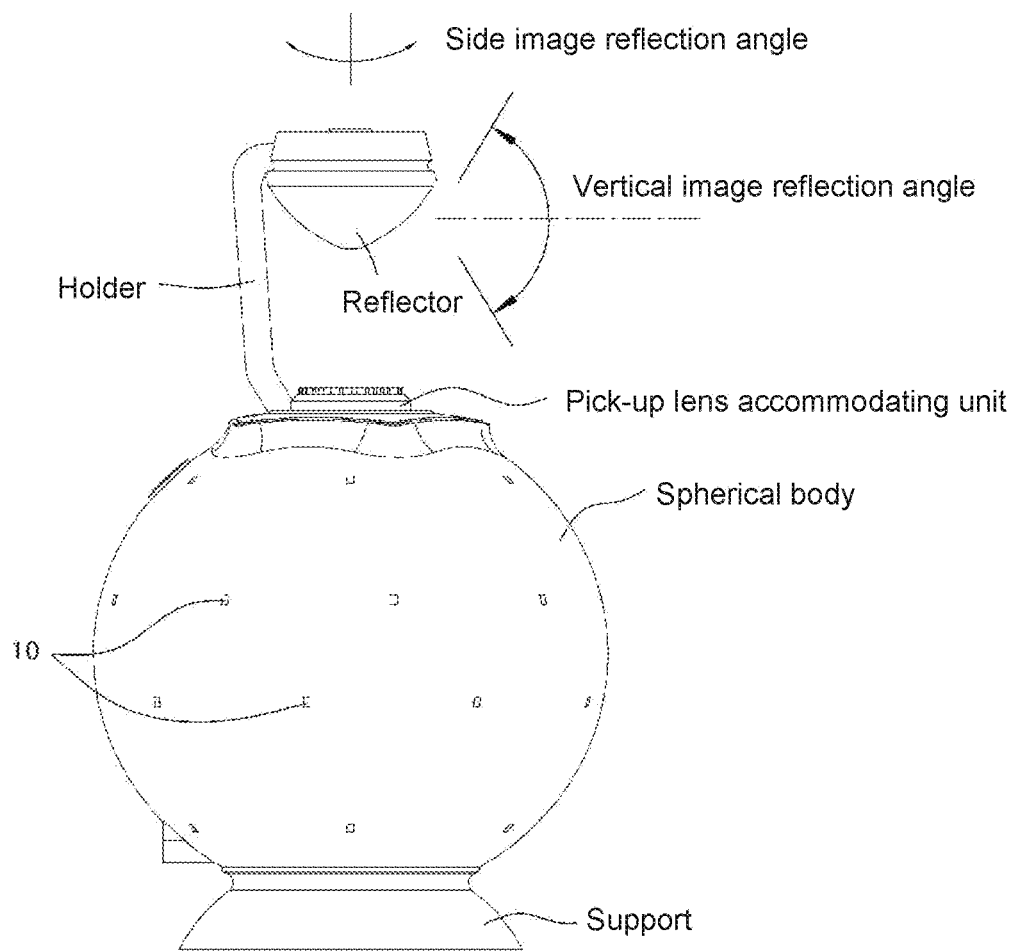
Figure 3:
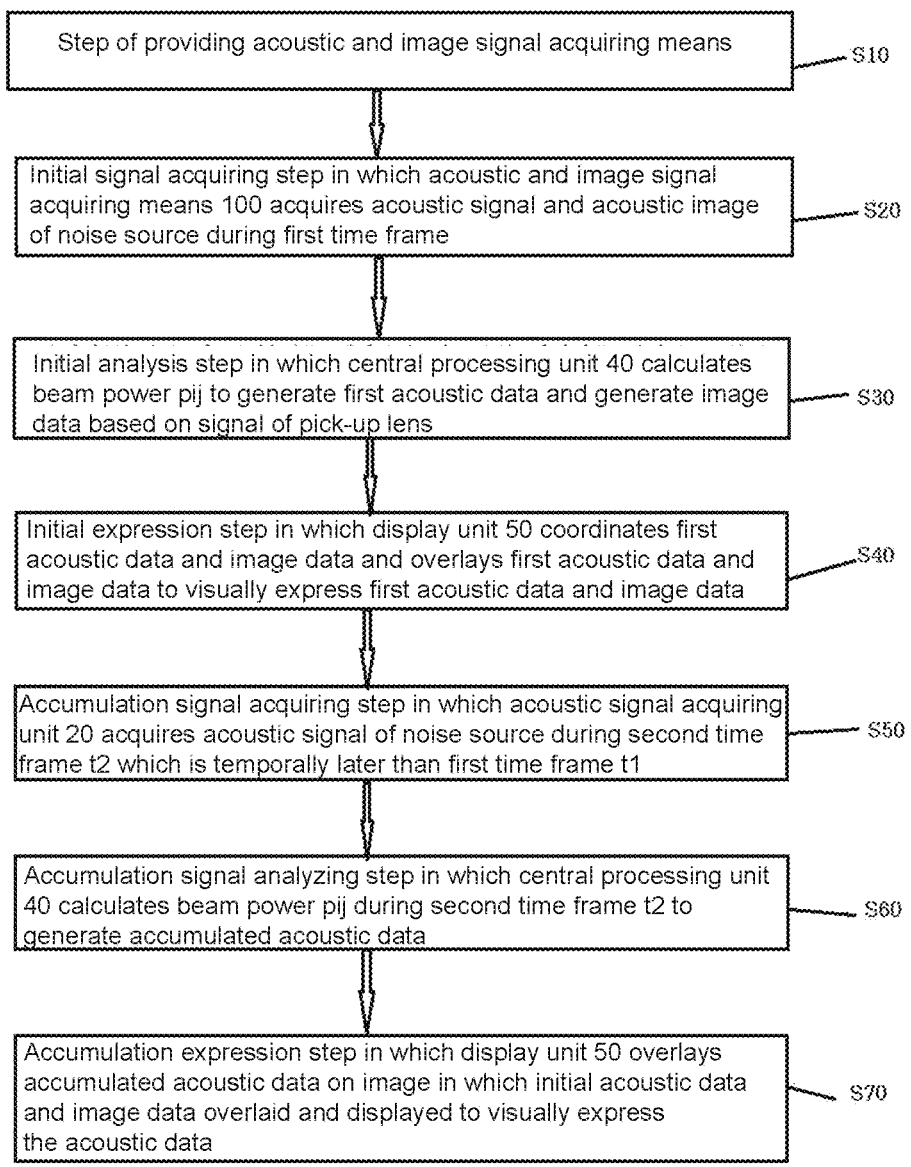
FIG. 3 is a flowchart of a noise source visualization data accumulation display method.
Figure 4A:
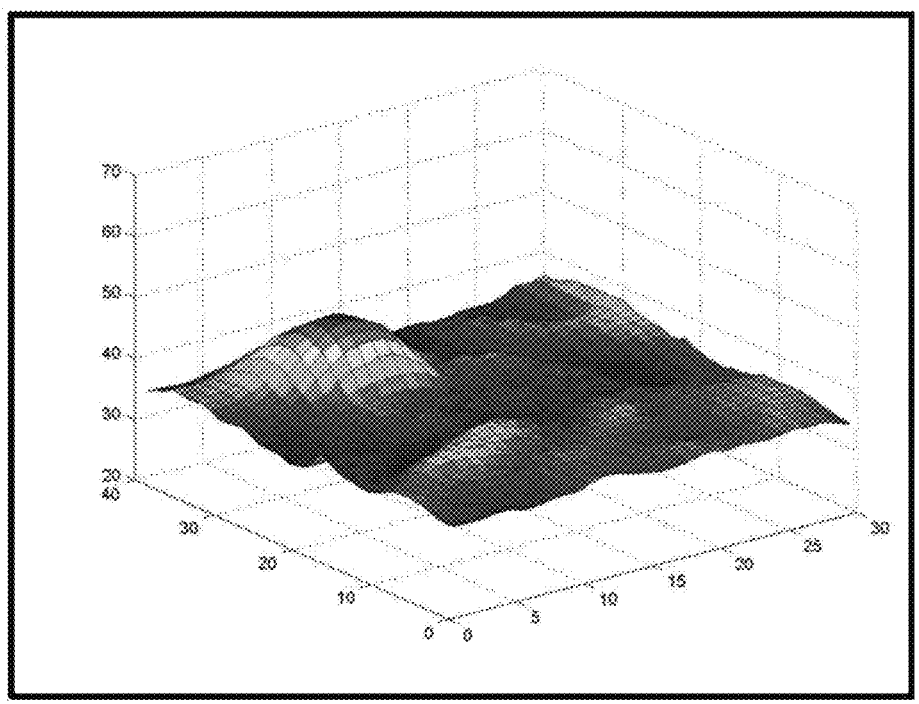
FIGS. 4A (overall all level: 45.1 DB) and 4B (over all level: 57.7 DB) illustrate two acoustic data (beam power levels) measured and analyzed at the same position at different time.
Figure 5A:
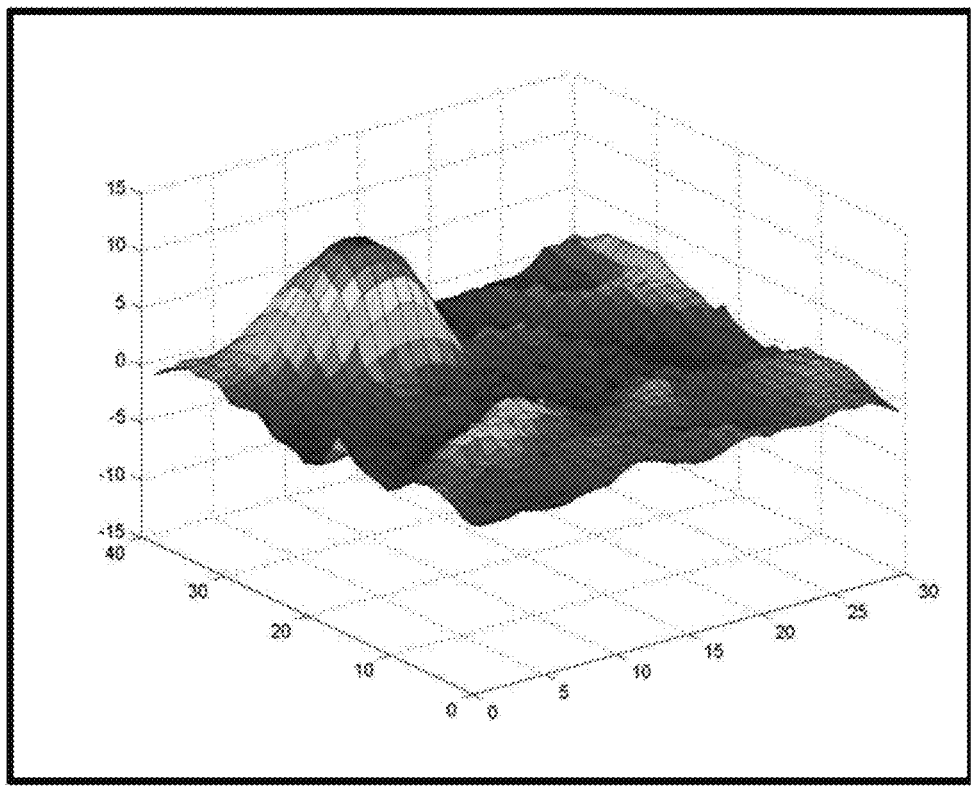
FIGS. 5A and 5B illustrate an acoustic data frame acquired by subtracting an average value from a beam power level value (a matrix element value, $P_{ij}$) of acoustic data displayed in matrix.
Figure 5B:
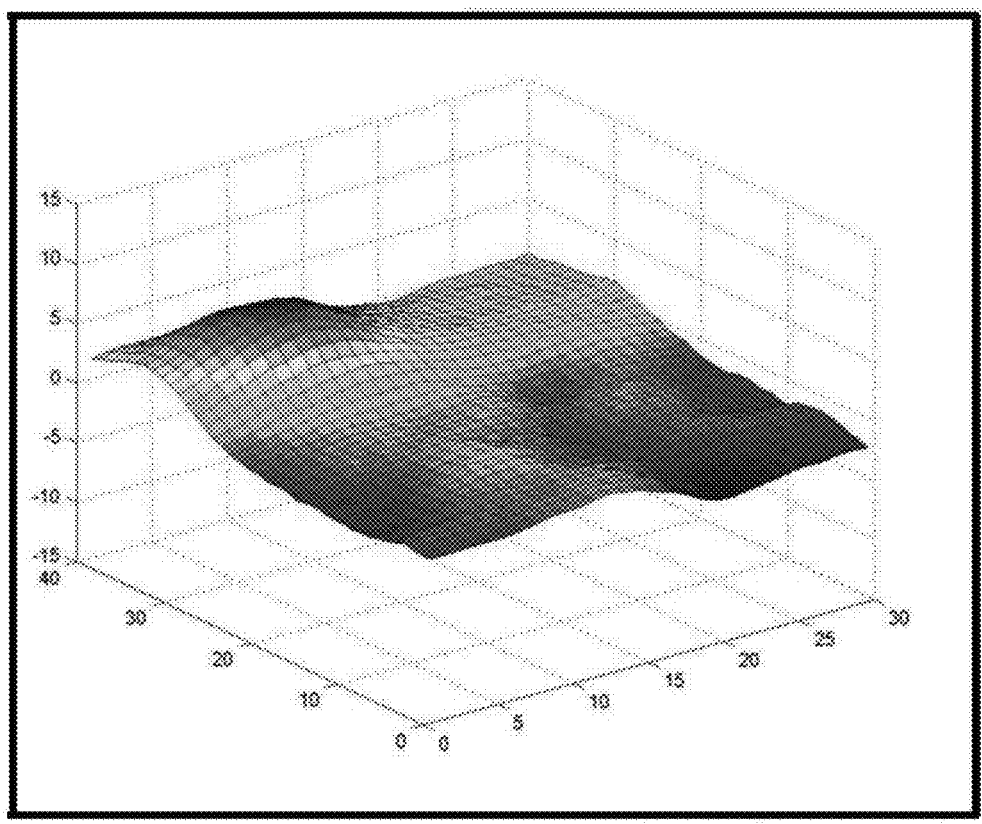
Figure 5C:
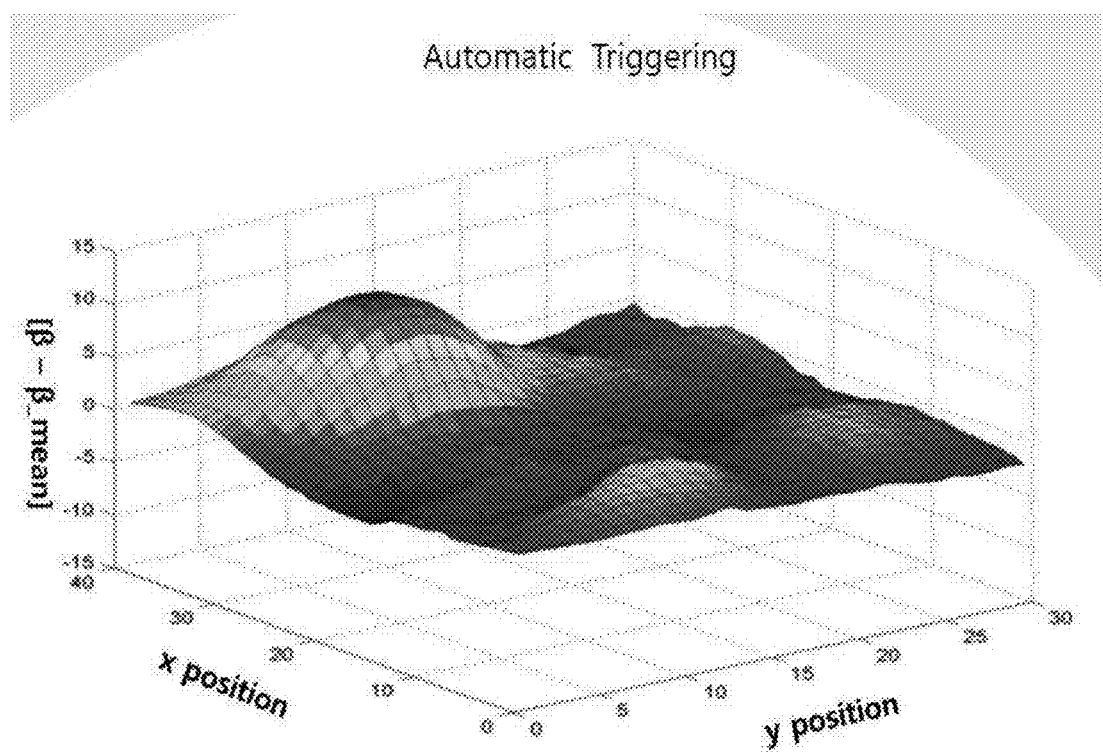
FIG. 5C illustrates an acoustic data frame in which respective matrix element values of the acoustic data frames of FIGS. 5A and 5B are averaged and illustrated.
Figure 6A:
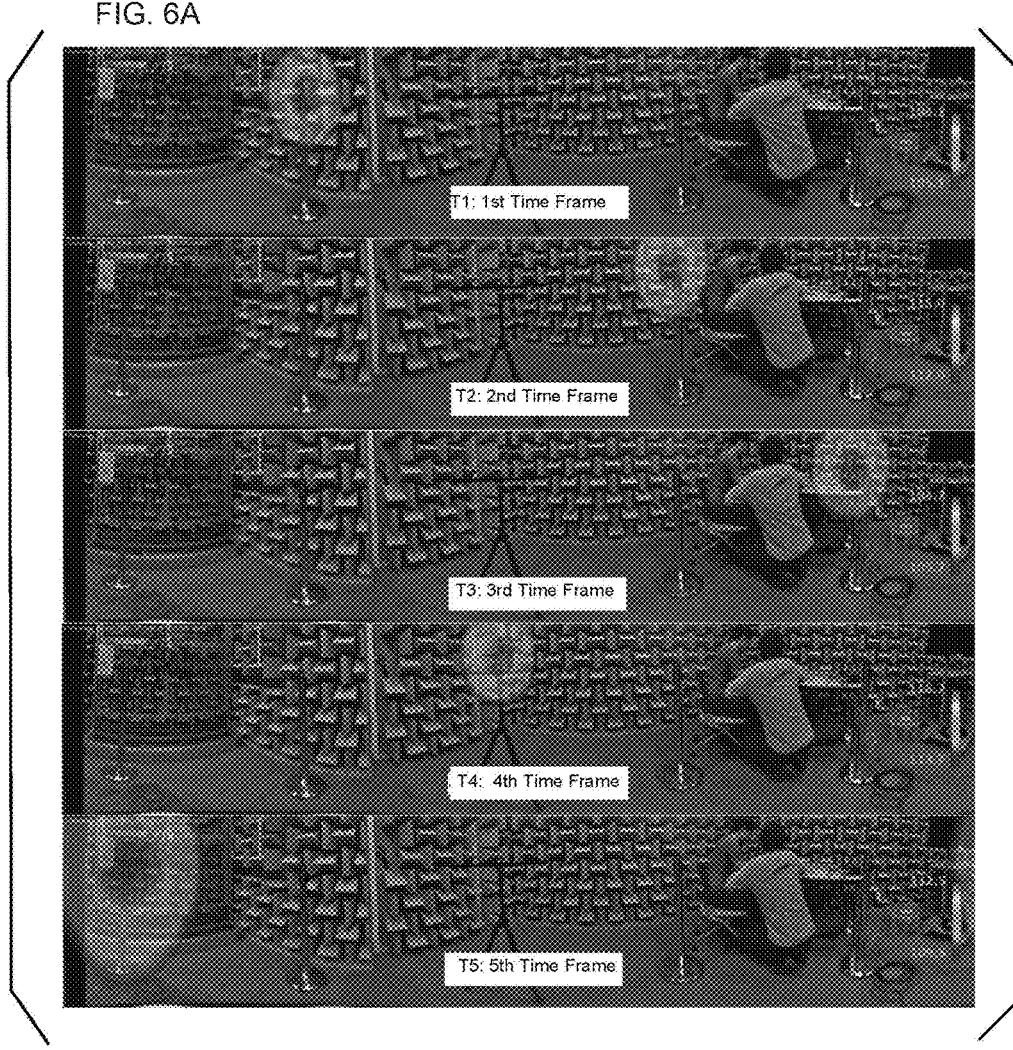
FIG. 6A illustrates a method and an acoustic and image data mapping image before noise source visualization data is accumulatively displayed.
Figure 6B:
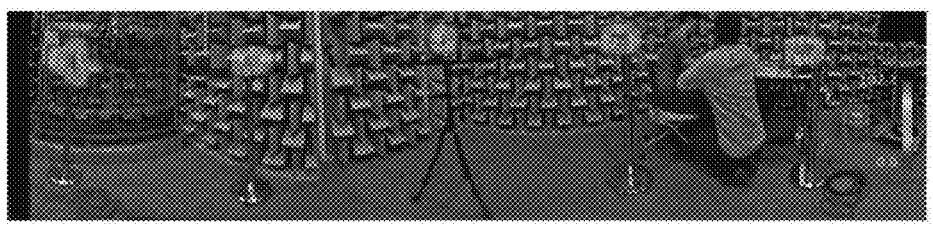
FIG. 6B illustrates an acoustic and image mapping image in which noise source visualization data is accumulatively displayed in one image according to the present invention.

FIGS. 1A and 1B are explanatory diagrams of a beamforming concept, FIG. 2 is a configuration diagram of a source noise visualization data accumulation display acoustic camera system, FIG. 3 is a flowchart of a noise source visualization data accumulation display method, FIGS. 4A (overall all level: 45.1 DB) and 4B (over all level: 57.7 DB) illustrate two acoustic data (beam power levels) measured and analyzed at the same position at different time, FIGS. 5A and 5B illustrate an acoustic data frame acquired by subtracting an average value from a beam power level value (a matrix element value, $P_{ij}$) of acoustic data displayed in matrix, FIG. 5C illustrates an acoustic data frame in which respective matrix element values of the acoustic data frames of FIGS. 5A and 5B are averaged and illustrated, FIG. 6A illustrates a method and an acoustic and image data mapping image before noise source visualization data is accumulatively displayed, and FIG. 6B illustrates an acoustic and image mapping image in which noise source visualization data is accumulatively displayed in one image according to the present invention.

As illustrated in FIGS. 2 to 6, the noise source virtualization data accumulation display method of the present invention is configured to include a step of providing an acoustic and image signal acquiring means 100 (S10), an initial signal acquiring step (S20), an initial analysis step (S30), an initial expression step (S40), an accumulation signal acquiring step (S50), an accumulation signal analyzing step (S60), and an accumulation expression step (S70).

<Steps S10 and S20>

As illustrated in FIGS. 2A and 2B, and 3, in the step of providing the acoustic and image signal acquiring means 100 (S10), provided is an apparatus configured to include MEMS acoustic sensors 10 disposed to be spaced apart on a curve or a plane at a regular interval to sense an acoustic signal of a noise source, an acoustic signal acquiring unit 20 converting the acoustic signal received from the MEMS acoustic sensors 10 into a digital signal and transmitting the digital signal to a central processing unit 40, and a pick-up lens 30 picking up an optical image of the noise source.

Herein, a micro electro mechanical system (MEMS) is a technology that simultaneously integrates a micro mechanical component having a micrometer size and an electronic circuit by applying a semiconductor manufacturing process in association with the MEMS acoustic sensors 10. A MEMS microphone measures mechanical transformation of a thin film by a pressure applied to the thin film by a change in capacitance between electrodes mounted in a thin-film sensor and has the same operating principle as a general condenser microphone. Since the MEMS microphone directly measures an analog signal by digital pulse density modulation (PDM) by using an ADC, the MEMS microphone has an advantage that a separate expensive ADC measurement device required in measurement by using an analog sensor is not required.

In the initial signal acquiring step (S20), the acoustic and image signal acquiring means 100 acquires the acoustic signal and the acoustic image of the noise source during a first time frame T1. In actual, the acoustic signal acquiring unit 20 may measure the analog signal at a continuous time interval without a pause period (only of a time section recognized as effective data by analysis and determination of a central processing unit is displayed and stored later).

<Steps S30 and S40>

In an exemplary embodiment (FIGS. 4A and 6A), in a first acoustic data generating step, the central processing unit 40 generates a beam power level matrix for each point of the noise source illustrated in FIG. 4A. In the initial analysis step (S30), the central processing unit 40 calculates beam power $P_{ij}$ of each point based on the acoustic signal acquired during the first time frame T1 to generate first acoustic data and generate image data based on a signal of the pick-up lens 30.

Herein, the acoustic data may be a beam power ($P_{ij}$) level of each point itself or a matrix type acoustic numerical value generated based on the beam power ($P_{ij}$) level of each point. Herein, the matrix type acoustic numerical value generated based on the beam power ($P_{ij}$) level may be, for example, a value acquired by subtracting an average value from the beam power ($P_{ij}$) level of each point as illustrated in FIGS. 5A and 5B. Alternatively, the matrix type acoustic numerical value may be divided into a maximum value, the average value, an overall level, and the like or a normalized value by using the maximum value, the average value, the overall level, and the like.

In an exemplary embodiment (FIG. 6A—T1), in the initial expression step (S40), a first image of FIG. 6A is expressed. In the initial expression step (S40), a display unit 50 coordinates the first acoustic data and image data calculated by the central processing unit 40 and overlays the first acoustic data and image data to visually express the first acoustic data and image data.

<Step S50>

In an exemplary embodiment, the accumulation signal acquiring step (S50), the MEMS acoustic sensors 10 and the acoustic signal acquiring unit 20 acquire the acoustic signal of the noise source during a second time frame T2 which is temporally later than the first time frame T1. In actual, the acoustic signal acquiring unit 20 will measure the analog signal at a continuous time interval without a pause period (only of a time section recognized as effective data by analysis and determination of a central processing unit is displayed or stored later).

<Step S60>

Figure 4B:
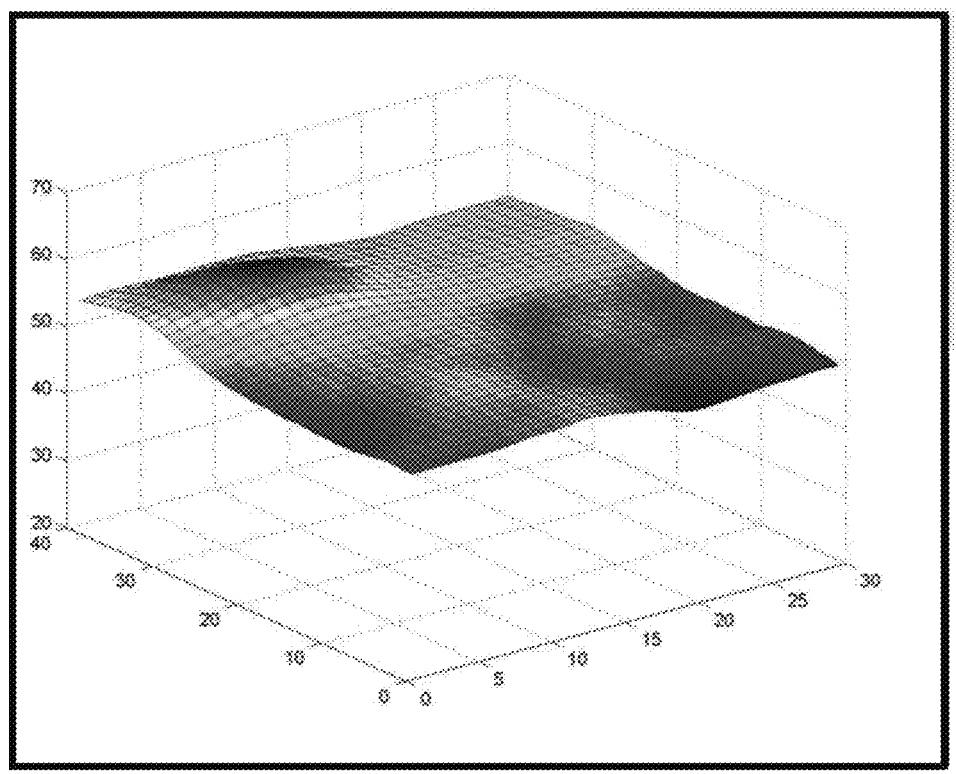

In an exemplary embodiment (FIGS. 4B and 6A—T2), in the accumulation signal analyzing step(S60), the central processing unit 40 generates the acoustic matrix illustrated in FIG. 4B.

The central processing unit 40 calculates the beam power $P_{ij}$ of each point based on the acoustic signal acquired during the second time frame T2 to generate accumulated acoustic data. Herein, the acoustic data may be a beam power ($P_{ij}$) level of each point itself or a matrix type acoustic numerical value generated based on the beam power ($P_{ij}$) level of each point. Herein, the matrix type acoustic numerical value generated based on the beam power ($P_{ij}$) level may be, for example, a value acquired by subtracting an average value from the beam power ($P_{ij}$) level of each point as illustrated in FIGS. 5A and 5B. Alternatively, the matrix type acoustic numerical value may be divided into a maximum value, the average value, an overall level, and the like or a normalized value by using the maximum value, the average value, the overall level, and the like.

<Step S70>

In an exemplary embodiment (FIGS. 5C and 6B), as illustrated in FIG. 6B, in the accumulation expression step (S70), the display unit 50 maps and displays second acoustic data D2 and initial acoustic data D1 or fifth, fourth, third, and second acoustic data D2, D3, D4, and D5, and the initial acoustic data D1 in one optical image.

Herein, as illustrated in FIG. 5C, the central processing unit 40 may generate an acoustic matrix M3 calculated by using the second acoustic data D2 and the initial acoustic data D1 and map and display the generated acoustic matrix M3 in the optical image. In FIG. 5C, the acoustic matrix M calculated by using the second acoustic data D2 and the initial acoustic data D1 represents $M_{ij}$ acquired by averaging the data FIGS. 5A and 5B (in this case, the calculation means an averaging operation).

Thereafter, steps S50, S60, and S70 are repeated, for example, one time to 10 times and in some cases, steps S50, S60, and S70 are repeated even more times to display noise source generation degrees at different time zones in one screen.

An embodiment being paraphrased, a noise source visualization data accumulation and display method, comprises: providing an acoustic and image signal acquiring means configured to include acoustic sensors disposed to be spaced apart on a curve or a plane at a regular interval to sense an acoustic signal of a noise source having points, an acoustic signal acquiring unit for converting the acoustic signal received from the acoustic sensors into a digital signal and transmitting the digital signal to a central processing unit, and a pick-up lens for picking up an optical image of the noise source; causing the acoustic and image signal acquiring means to acquire the acoustic signal and the acoustic image of the noise source during a first time frame (T1); causing the central processing unit 40 to calculate beam power ($P_{ij}$) of each point of the noise source based on the acoustic signal acquired during the first time frame (T1) to generate first acoustic data and generate image data based on a signal of the pick-up lens; causing a display unit to coordinate the first acoustic data and image data calculated by the central processing unit and overlay the first acoustic data and image data to visually express the first acoustic data and image data; causing the acoustic signal acquiring unit to acquire the acoustic signal of the noise source during a second time frame (T2) which is temporally later than the first time frame (T1); causing the central processing unit 40 to calculate the beam power ($P_{ij}$) of each point of the noise source based on the acoustic signal acquired during the second time frame (T2) to generate accumulated acoustic data; and causing the display unit to overlay and map an acoustic matrix (M3) calculated by using the acoustic data (D2) acquired during the second time frame (T2) and the acoustic data (D1) to image data to visually express the acoustic matrix (M3) mapped to the image data.

Another embodiment being paraphrased, a noise source visualization data accumulation and display method, comprises: providing an acoustic and image signal acquiring means configured to include acoustic sensors disposed to be spaced apart on a curve or a plane at a regular interval to sense an acoustic signal of a noise source having points, and an acoustic signal acquiring unit for converting the acoustic signal received from the acoustic sensors into a digital signal and transmitting the digital signal to a central processing unit, and a pick-up lens for picking up an optical image of the noise source; causing the acoustic and image signal acquiring means to acquire the acoustic signal and the acoustic image of the noise source during a first time frame (T1); causing the central processing unit to calculate beam power ($P_{ij}$) of each point of the noise source based on the acoustic signal acquired during the first time frame (T1) to generate first acoustic data and generate image data based on a signal of the pick-up lens; causing a display unit to coordinate the first acoustic data and image data calculated by the central processing unit and overlay the first acoustic data and image data to visually express the first acoustic data and image data; causing the acoustic signal acquiring unit to acquire the acoustic signal of the noise source during a second time frame (T2) which is temporally later than the first time frame (T1); causing the central processing unit to calculate the beam power ($P_{ij}$) of each point of the noise source based on the acoustic signal acquired during the second time frame (T2) to generate accumulated acoustic data; causing the display unit to overlay and map an acoustic matrix (M3) calculated by using the acoustic data (D2) acquired during the second time frame (T2) and the acoustic data (D1) acquired during the first time frame (T1) to image data to visually express the acoustic matrix (M3) mapped to the image data; causing the central processing unit, when a value calculated by using a difference value of at least two beam power values selected among beam power ($P_{ij}$) values of each point calculated based on the acoustic signal during one time frame is larger than a predetermined value, to treat the value as the effective acoustic data to map the value to the image data and overlay and display the value mapped to the image data or make the value as a triggering signal of data storing; and causing the central processing unit, when a difference of a maximum value ($P_{max}$) and a minimum value ($P_{min}$) among the beam power ($P_{ij}$) values is larger than a predetermined reference value ($\Delta P1$) or a difference of the maximum value ($P_{max}$) and an average value ($P_{mean}$) is larger than a predetermined reference value ($\Delta P2$), to treat the value as the effective acoustic data to map and overlay and display the value to the image data or make the value as the triggering signal of the data storing.

Still another embodiment being paraphrased, an acoustic camera system for a noise source visualization data accumulation and display, comprises: acoustic sensors disposed to be spaced apart on a curve or a plane at a regular interval to send an acoustical signal of a noise source having points; an acoustic signal acquiring unit for converting the acoustic signal received from the acoustic sensors into a digital signal and transmitting the digital signal to a central processing unit; a pick-up lens for picking up an optical image of the noise source; a central processing unit for calculating the beam power ($P_{ij}$) of each point of the noise source based on the acoustic data and generating image data based on a signal of the pick-up lens; and a display unit for coordinating the acoustic data and the image data calculated by the central processing unit and overlaying the first acoustic data and the image data to visually express the acoustic data and the image data, and, wherein the central processing unit generates at least two or more sound visualization images by beamforming the acoustic signals acquired at different moments by using the acoustic sensors and the acoustic signal acquiring unit and thereafter, maps an acoustic matrix (M) calculated by using accumulated acoustic data (D2) and initial acoustic data (D1) onto one optical image and displays the acoustic matrix (M) mapped onto the optical image.

<Determination of Effective Data and Triggering>

In the initial analysis step (S30) or the accumulation signal analyzing step (S60), when a value calculated by using a difference value of at least two beam power values selected among beam power ($P_{ij}$) values of each point calculated based on the acoustic signal during one time frame is larger than a predetermined value, the central processing unit 40 treats the value as the effective acoustic data to map the value to the image data and overlay and display the value mapped to the image data or make the value as a triggering signal of data storing. In the initial analysis step (S30) or the accumulation signal analyzing step (S60), when a difference of a maximum value $P_{max}$ and a minimum value $P_{min}$ among the beam power ($P_{ij}$) values is larger than a predetermined reference value $\Delta P1$ or a difference of the maximum value $P_{max}$ and an average value $P_{mean}$ is larger than a predetermined reference value $\Delta P2$, the central processing unit 40 treats the value as the effective acoustic data to map and overlay and display the value to the image data or make the value as the triggering signal of the data storing. When a standard deviation value of the beam power ($P_{ij}$) values of each point calculated based on the acoustic signal acquired during one time frame is larger than a predetermined reference, the central processing unit 40 determines that effective noise is generated and treats the effective noise as the effective acoustic data to map the value as the effective acoustic data to map the value to the image data and overlap and display the value mapped to the image data or make the value as the triggering signal of the data storing.

As illustrated in FIGS. 2 to 6, the noise source visualization data accumulation display method of the present invention is configured to include the MEMS acoustic sensors 10, the acoustic signal acquiring unit 20, the pick-up lens 30, the central processing unit 40, and the display unit 50. As illustrated in FIG. 2B, the MEMS acoustic sensors 10 are disposed on a curve or a plane (not illustrated) to be spaced apart from each other at a regular interval to sense the acoustic signal of the noise source. The acoustic signal acquiring unit 20 converts the acoustic signals received from the MEMS acoustic sensors 10 into digital signals and transmits the digital signals to the central processing unit 40.

The pick-up lens 30 picks up an optical image of the noise source. The central processing unit 40 calculates the beam power $P_{ij}$ of each point based on the acoustic signal acquired during a time frame to generate acoustic data and generate image data based on a signal of the pick-up lens 30. The display unit 50 coordinates the acoustic data and the image data calculated by the central processing unit 40 and overlays the first acoustic data and the image data to visually express the acoustic data and the image data.

In this case, the central processing unit 40 generates at least two or more sound visualization images by beamforming the acoustic signals acquired at different moments by using the MEMS acoustic sensors 10 and the acoustic signal acquiring unit 20 and thereafter, maps the generated sound visualization images onto one optical image acquired from the pick-up lens 30 and displays the sound visualization images mapped to the optical image. The central processing unit 40 maps at least two or more acoustic data by beamforming the acoustic signals acquired at different moments and thereafter, normalizes the generated acoustic data and maps the normalized acoustic data onto the optical image to accumulate and display the acoustic data mapped onto the optical image.

The present invention has been described in association with the above-mentioned preferred embedment, but the scope of the present invention is not limited to the embodiment and the scope of the present invention is determined by the appended claims, and thereafter, the scope of the present invention will includes various modifications and transformations included in an equivalent range to the present invention.

Reference numerals disclosed in the appended claims are just used to assist appreciation of the present invention and it is revealed that the reference numerals do not influence analysis of the claims and it should not be narrowly analyzed by the disclosed reference numerals.

What is claimed is:

1. A noise source visualization data accumulation and display method, comprising:
   providing an acoustic and image signal acquiring means configured to include
      acoustic sensors disposed to be spaced apart on a curve or a plane at a regular interval to sense an acoustic signal of a noise source having points,
      an acoustic signal acquiring unit for converting the acoustic signal received from the acoustic sensors into a digital signal and transmitting the digital signal to a central processing unit, and
      a pick-up lens for picking up an optical image of the noise source;
   causing the acoustic and image signal acquiring means to acquire the acoustic signal and the acoustic image of the noise source during a first time frame (T1);
   causing the central processing unit to calculate beam power ($P_{ij}$) of each point of the noise source based on the acoustic signal acquired during the first time frame (T1) to generate first acoustic data and generate image data based on a signal of the pick-up lens;
   causing a display unit to coordinate the first acoustic data and image data calculated by the central processing unit and overlay the first acoustic data and image data to visually express the first acoustic data and image data;
   causing the acoustic signal acquiring unit to acquire the acoustic signal of the noise source during a second time frame (T2) which is temporally later than the first time frame (T1);
   causing the central processing unit to calculate the beam power ($P_{ij}$) of each point of the noise source based on the acoustic signal acquired during the second time frame (T2) to generate accumulated acoustic data; and
   causing the display unit to overlay and map an acoustic matrix (M3) calculated by using the acoustic data (D2) acquired during the second time frame (T2) and the acoustic data (D1) to image data to visually express the acoustic matrix (M3) mapped to the image data.

2. The noise source visualization data accumulation and display method of claim 1, wherein when a value calculated by using a difference value of at least two beam power values selected among beam power ($P_{ij}$) values of each point of the noise signal calculated based on the acoustic signal during one time frame is larger than a predetermined value, causing the central processing unit to treat the value as the effective acoustic data to map the value to the image data and overlap and display the value mapped to the image data or make the value as a triggering signal of data storing.

3. A noise source visualization data accumulation and display method, comprising:
   providing an acoustic and image signal acquiring means configured to include
      acoustic sensors disposed to be spaced apart on a curve or a plane at a regular interval to sense an acoustic signal of a noise source having points, and
      an acoustic signal acquiring unit for converting the acoustic signal received from the acoustic sensors into a digital signal and transmitting the digital signal to a central processing unit, and
      a pick-up lens for picking up an optical image of the noise source;
   causing the acoustic and image signal acquiring means to acquire the acoustic signal and the acoustic image of the noise source during a first time frame (T1);
   causing the central processing unit to calculate beam power ($P_{ij}$) of each point of the noise source based on the acoustic signal acquired during the first time frame (T1) to generate first acoustic data and generate image data based on a signal of the pick-up lens;
   causing a display unit to coordinate the first acoustic data and image data calculated by the central processing unit and overlay the first acoustic data and image data to visually express the first acoustic data and image data;
   causing the acoustic signal acquiring unit to acquire the acoustic signal of the noise source during a second time frame (T2) which is temporally later than the first time frame (T1);
   causing the central processing unit to calculate the beam power ($P_{ij}$) of each point of the noise source based on the acoustic signal acquired during the second time frame (T2) to generate accumulated acoustic data;
   causing the display unit to overlay and map an acoustic matrix (M3) calculated by using the acoustic data (D2) acquired during the second time frame (T2) and the acoustic data (D1) acquired during the first time frame (T1) to image data to visually express the acoustic matrix (M3) mapped to the image data;

causing the central processing unit, when a value calculated by using a difference value of at least two beam power values selected among beam power ($P_{ij}$) values of each point calculated based on the acoustic signal during one time frame is larger than a predetermined value, to treat the value as the effective acoustic data to map the value to the image data and overlay and display the value mapped to the image data or make the value as a triggering signal of data storing; and causing the central processing unit, when a difference of a maximum value ($P_{max}$) and a minimum value ($P_{min}$) among the beam power ($P_{ij}$) values is larger than a predetermined reference value ($\Delta P1$) or a difference of the maximum value ($P_{max}$) and an average value ($P_{mean}$) is larger than a predetermined reference value ($\Delta P2$), to treat the value as the effective acoustic data to map and overlay and display the value to the image data or make the value as the triggering signal of the data storing.

4. The noise source visualization data accumulation and display method of claim 3, causing the central processor, when a standard deviation value of the beam power ($P_{ij}$) values of each point calculated based on the acoustic signal acquired during one time frame is larger than a predetermined reference, to determine that effective noise is generated and to treat the effective noise as the effective acoustic data to map the value to the image data and overlap or make the value as the triggering signal of the data storing.

5. An acoustic camera system for a noise source visualization data accumulation and display, comprising;

acoustic sensors disposed to be spaced apart on a curve or a plane at a regular interval to send an acoustical signal of a noise source having points;

an acoustic signal acquiring unit for converting the acoustic signal received from the acoustic sensors into a digital signal and transmitting the digital signal to a central processing unit;

a pick-up lens for picking up an optical image of the noise source;

a central processing unit for calculating the beam power ($P_{ij}$) of each point of the noise source based on the acoustic data and generating image data based on a signal of the pick-up lens; and a display unit for coordinating the acoustic data and the image data calculated by the central processing unit and overlaying the first acoustic data and the image data to visually express the acoustic data and the image data, and wherein the central processing unit generates at least two or more sound visualization images by beamforming the acoustic signals acquired at different moments by using the acoustic sensors and the acoustic signal acquiring unit and thereafter, maps an acoustic matrix (M) calculated by using accumulated acoustic data (D2) and initial acoustic data (D1) onto one optical image and displays the acoustic matrix (M) mapped onto the optical image.

6. The acoustic camera system of claim 5, wherein the central processing unit maps at least two or more acoustic data by beamforming the acoustic signals acquired at different moments and thereafter, normalizes the generated acoustic data and overlaps and maps the normalized acoustic data on the optical image to display the acoustic data mapped onto the optical image.

\* \* \* \* \*